(12) United States Patent
Paterson

(10) Patent No.: US 8,091,323 B2
(45) Date of Patent: Jan. 10, 2012

(54) RESEALABLE FILM STRUCTURE

(75) Inventor: Stuart Graham Paterson, Fox River Grove, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1271 days.

(21) Appl. No.: 11/615,473

(22) Filed: Dec. 22, 2006

(65) Prior Publication Data

US 2008/0152850 A1    Jun. 26, 2008

(51) Int. Cl.
B65B 51/10    (2006.01)
(52) U.S. Cl. ............... 53/469; 53/477; 53/172; 428/40.1
(58) Field of Classification Search ............... 53/452, 53/451, 450, 455, 469, 477, 172, 562, 563, 53/574; 428/40.1, 411.1, 42.3
See application file for complete search history.

(56) References Cited

U.S. PATENT DOCUMENTS

| | | | |
|---|---|---|---|
| 3,650,386 A | | 3/1972 | Tigner |
| 3,655,503 A | * | 4/1972 | Stanley et al. ............... 428/336 |
| 4,521,467 A | * | 6/1985 | Berger ............... 428/40.6 |
| 4,615,926 A | * | 10/1986 | Hsu et al. ............... 428/35.2 |
| 4,673,601 A | * | 6/1987 | Lamping et al. ............ 428/35.7 |
| 4,858,780 A | | 8/1989 | Odaka et al. |
| 5,089,320 A | | 2/1992 | Straus et al. |
| 5,382,472 A | * | 1/1995 | Yanidis et al. ............... 428/349 |
| 5,401,533 A | | 3/1995 | Borland |
| 5,845,463 A | * | 12/1998 | Henaux ............... 53/450 |
| 5,882,749 A | | 3/1999 | Jones et al. |
| 5,882,789 A | | 3/1999 | Jones et al. |
| 5,993,961 A | | 11/1999 | Ugolick et al. |
| 5,993,962 A | | 11/1999 | Timm et al. |
| 6,007,246 A | | 12/1999 | Kinigakis et al. |
| RE37,171 E | * | 5/2001 | Busche et al. ............... 383/210 |
| 6,413,599 B1 | | 7/2002 | Petricca et al. |
| 6,502,986 B1 | | 1/2003 | Bensur et al. |
| 6,511,723 B1 | | 1/2003 | Engelaere |
| 6,737,130 B2 | | 5/2004 | Ferri |
| 6,777,050 B1 | | 8/2004 | Engelaere |
| 6,858,275 B2 | | 2/2005 | Ferri et al. |
| 6,913,809 B2 | | 7/2005 | Wolak |
| 2003/0044492 A1 | | 3/2003 | Knigge et al. |
| 2004/0180118 A1 | | 9/2004 | Renger et al. |

FOREIGN PATENT DOCUMENTS

| | | |
|---|---|---|
| EP | 0 306 982 A2 | 3/1989 |
| EP | 0 830 248 | 3/1998 |
| EP | 0 957 045 B1 | 11/1999 |
| EP | 1 202 916 A | 5/2002 |
| EP | 1 278 630 B1 | 1/2003 |
| EP | 1 569 188 A2 | 8/2005 |
| JP | 2000-281088 | 10/2000 |
| WO | WO 96/40504 A1 | 12/1996 |
| WO | WO 98/49072 A1 | 11/1998 |
| WO | WO 01/09001 A1 | 2/2001 |

* cited by examiner

*Primary Examiner* — Paul Durand
(74) *Attorney, Agent, or Firm* — Fitch, Even, Tabin & Flannery

(57) ABSTRACT

A reclosable film structure for a package is disclosed, in particular a reclosable lap seal, comprising a multiple layer film with an interior pressure sensitive adhesive layer, and methods of manufacture thereof. The pressure sensitive adhesive layer is positioned between a first and a third layer on either side of the pressure sensitive adhesive layer and is continuous throughout the package. The package is heat sealed at an open end to initially close the package by folding over an outer lap seal segment onto an inner lap seal segment and heat-sealing together. Upon opening the package at the lap seal, the package delaminates between the first and second layers along one of the lap seal segments, thus exposing the pressure sensitive adhesive layer to facilitate reclosing the package, oriented away from the package interior and away from the food removal path to maintain the adhesion strength by avoiding food contact.

17 Claims, 2 Drawing Sheets

RESEALABLE FILM STRUCTURE

FIELD

This disclosure relates generally to resealable film structures, and more specifically to laminate film structures for resealable packages.

BACKGROUND

Laminate films are often used in the packaging of food products and may have easy-open features, or provide for reclosable features, or both. Reclosable features may be provided at the seal of a bag where it is also opened, and upon opening the package the reclose feature delaminates to expose an adhesive layer used in resealing the package. Typically upon opening, the adhesive layer will remain attached to one or both sides of a film laminate such that the adhesive is often facing the food product side of a package interior, and susceptible to contamination from the food product, thus decreasing its adhesive properties.

Multiple layer films are known that do not have reclosable or adhesive features. U.S. Pat. No. 6,913,809 provides for a lap sealed closure for a bag with a peel layer for opening, where the bag is at least a three layer film that consists of a seal layer and a barrier layer, with a peel layer positioned between the two. When the bag ends are brought together in an overlapping manner to form a lap seal, the seal layer on one side is in contact with the barrier layer of the other side and is sealed together, and when opened the peel layer is separated from the other layers. The peel layer is designed to tear within the layer itself or to tear at its interface with the adjacent layers to make the bag easy to open. However, once these multiple layer film bags are opened, they cannot be easily resealed.

There are many reclosable, adhesive systems known in the art that provide for resealing packages after opening, however the adhesive side is typically exposed towards the package interior where the food product is located, thus presenting a possibility of contamination of the adhesive with food product particles. Furthermore, the known adhesive-reclosure systems are primarily used with fin seal closures. U.S. Pat. No. 5,382,472 provides a packaging material where only the ends of the film layer contain a pressure sensitive adhesive (PSA) layer positioned between two adjacent layers of film made in a side-by-side coextrusion, to provide the resealable seal. The adjacent layers of film are sealed to each other in a fin seal arrangement, and upon opening, the heat-sealable polymer layers remain sealed to one another and peel apart instead at the PSA layer and one of the heat-sealable polymer layers. The bag itself is made up of one or two layers of a material, with just the resealable seal ends containing the at least three layer PSA configuration. Manufacturing a bag with a variation of layers throughout makes the manufacturing process more complex and time-consuming, in addition to the added expense of additional manufacturing steps required to make the multiple layer film only at the ends. Furthermore, once the PSA layer is exposed it is oriented towards the interior of the package, which may be susceptible to picking up food product particles along the PSA layer and thus causing it to lose its adhesion strength for subsequent reclosures.

U.S. Pat. No. 6,502,986 provides a package with a resealable end closure. The package is heat-sealed to form a fin-seal at its end closure, where the ends of a flexible sheet are heat-sealed together and the sheet may comprise one or more layers. Adjacent to the end seal at one end of the package a resealable seal is also formed. When the end seal is peeled apart to open the package, the resealable seal is also separated at an area of a PSA, while heat seal coatings applied over the PSA and to the opposite inner surface of the other end of the sheet remain sealed to one another; thus some amount of PSA remains on one or both sides of the interior flexible sheets with the PSA exposed towards the package interior. This package requires additional process steps to add a PSA between the ends of the sheet, as well as potentially losing the adhesion strength of the PSA due to the PSA being oriented towards the package interior and the food product.

U.S. Pat. No. 5,089,320 discloses a package where an adhesive layer is coated onto a substrate layer used for flexible packaging. The adhesive layer may be coated only in the area where the package is to be opened or may be coextruded with the substrate layer throughout the film, and is further covered by and/or coextruded with a skin layer placed over the adhesive layer. The package is sealed to itself, and when it is opened at the adhesive layer area it is broken apart at the skin layer, thus exposing the adhesive, either between the adhesive and skin layer, or between the substrate and adhesive, or both. The skin layer seals to itself, thus forming a fin seal arrangement. The adhesive layer is oriented towards the interior of the package and may be susceptible to contamination from food, thus losing its adhesion properties. Furthermore, the manufacture of the package must be done to ensure that the skin layer is oriented to seal against the skin layer of the other side in order to form a proper heat seal, thus adding further steps to the manufacturing process and making it more involved.

Still other types of resealable packages simply consist of an adhesive layer coated directly onto the package substrate and sealed to the other side, with minimal or no other layers between. U.S. Pat. No. 5,993,962 has a package comprising a first surface of a substrate having a strip of cold seal adhesive applied over the PSA strip, where the PSA strip is applied to a first substrate. A second substrate also contains a strip of cold seal adhesive. The first and second substrates are bonded together at the area of the cold seal adhesive and when the two areas of substrate surfaces are peeled apart to open the package, the PSA is removed from the first substrate and remains on the second substrate forming a resealable area, while the two cold seal adhesive areas remain bonded to each other. This adds an extra manufacturing step of coating a PSA and cold-seal adhesives onto the package substrates. Furthermore, such inline coating of a PSA can require additional equipment, and inline application of glue can be messy and lead to more frequent line stopping for cleaning.

Many of these known reclosable packages consist of adding an adhesive to a flexible package in the area of the seal only and/or manufacturing the package such that the adhesive is only in the area of the seal. Still other packages can heat seal against itself in only a fin seal arrangement. These can be time-consuming and difficult to do, as well as adding to the expense of manufacturing. Furthermore, as the adhesive is exposed upon opening, it is oriented towards the package interior where the food product is packaged and can be susceptible to contamination of the adhesive with the food, thus losing its adhesion and reclose properties.

SUMMARY

A reclosable film structure for a package is disclosed, in particular a reclosable lap seal, comprising a multiple layer film with an interior pressure sensitive adhesive layer, and methods of manufacture thereof. The pressure sensitive adhesive layer is positioned between a first and a third layer on either side of the pressure sensitive adhesive layer and is continuous throughout the package. The package is heat sealed at an open end to initially close the package by folding over an outer lap seal segment onto an inner lap seal segment and heat-sealing together. Upon opening the package at the lap seal, the package delaminates between the first and second layers along one of the lap seal segments, thus exposing the pressure sensitive adhesive layer to facilitate reclosing the package, oriented away from the package interior and away from the food removal path to maintain the adhesion strength by avoiding food contact The film structure includes at least a first layer, a second pressure sensitive adhesive (PSA) layer, and a third layer. The at least three layers may be continuous throughout the entire bag. The PSA layer is positioned between the first and third layer, such that the PSA layer is not exposed on the film, thus making manufacturing easier because the PSA layer does not become stuck to equipment. Furthermore, the at least three layers may be positioned continuously throughout the web, rather than only at the edges of the bag in the seal area, which would require more extensive manufacturing steps to manufacture. As a result, conventional packaging equipment may be used.

Either a fin seal or lap seal arrangement may be used as both the first and third layers may be capable of forming heat seals. Furthermore, the reclosable seal may be formed at an outer edge of the package. The seal area may be positioned to ensure that when the package is opened and the PSA is exposed, that the exposed PSA is oriented towards the exterior of the package and thus can avoid contamination of the adhesive layer with food product to retain adhesion and reclose properties.

The reclosable seal may further comprise heat seal strengths between layers such that the heat seal strength between the first and third layers is greater than the strength between the second and third layers, and the heat seal strength between the second and third layers is greater than the strength between the first and second layers. Upon opening, the first layer on the inner seal segment may separate from the second layer of the inner seal segment to expose the PSA layer attached to the inner seal segment, or the first layer on the outer seal segment may separate from the second layer of the outer seal segment to expose the PSA layer attached to the inner seal segment. Both the first layer and the third layer may contain at least one side that is heat-sealable and both may be polyolefin layers.

In another aspect, a reclosable package may comprise a web of film having at least a first layer, a second pressure sensitive adhesive (PSA) layer, and a third layer with a food product contained therein. A reclosable lap seal may be formed on the package for gaining access to the food product within the package interior. The reclosable lap seal has an inner lap seal segment and an outer lap seal segment each having the same three layers of film as the web of film of the package.

A method of manufacture for a reclosable seal for a package comprises heat-sealing a first edge to form the reclosable seal by contacting a first seal segment to a second seal segment and sealing the two segments to each other such that a heat seal is formed in a region between either a first or a third layer of the first seal segment and a third layer of the second seal segment. The package has a first layer, a second pressure sensitive adhesive layer, and a third layer throughout the package. The package is initially made by folding a single layer of a three-ply laminate film having the three above layers, into a package such that one edge is a fold seam and the other three edges are sealed together to form a closure. A second and a third edge of the package are heat-sealed to close and to form a second and a third seal, respectively. The second and third edges are opposite from each other and transverse to the first edge and may be sealed in either a fin or lap seal arrangement.

DETAILED DESCRIPTION OF THE DRAWINGS

A reclosable film structure for a package, and in particular a reclosable lap seal for a package comprising a multiple layer film with an interior pressure sensitive adhesive layer, and methods of manufacture, are disclosed herein and illustrated in FIGS. 1-5. The reclosable lap seal has an exposed pressure sensitive adhesive layer that is positioned out of the food removal path after initially opening the package at a heat seal area, while also providing a resealable and reclosable lap seal using the exposed pressure sensitive adhesive.

The reclosable lap seal for a package may be made from a single web of film or from two or more layers sealed together; typically a single web of film is used. The film may wrap around the food product to be packaged, and the side edges of film brought together and sealed. Alternatively, the side edges may be sealed first and the package filled afterwards. The single web of film may comprise a multiple layer laminate film having at least a first layer, a second pressure sensitive adhesive layer, and a third layer. Each layer may be continuous throughout the web of film. As the ends of the web are brought together to form the reclosable lap seal at the opening area, the film layers are brought together such that an outer lap seal segment may be folded over and onto an inner lap seal segment to cover an opening of the package. The inner and outer lap seal segments are then heat-sealed in an area where the two overlap and contact one another, forming a lap seal. The first layer on the inner lap seal segment contacts the third layer of the outer lap seal segment and the two layers are heat sealed together to form a closure seal. The heat seal forms a heat seal strength between the three layers, such that the heat seal strength between the first and third layers is stronger than the second and third layers, which is stronger still than the first and second layers.

Upon opening the package, the lap seal is separated to gain access to the package interior by removing the outer lap seal segment from the inner lap seal segment. As the lap seal is separated, the heat seal between the first and second layers is delaminated in the area where the heat was applied, but only along the one of the inner lap seal segment and the outer lap seal segment and only in the area of the heat seal. As the first and second layers are separated, the adhesive layer on the second layer is exposed to facilitate reclosure with the other segment.

Figure 1:
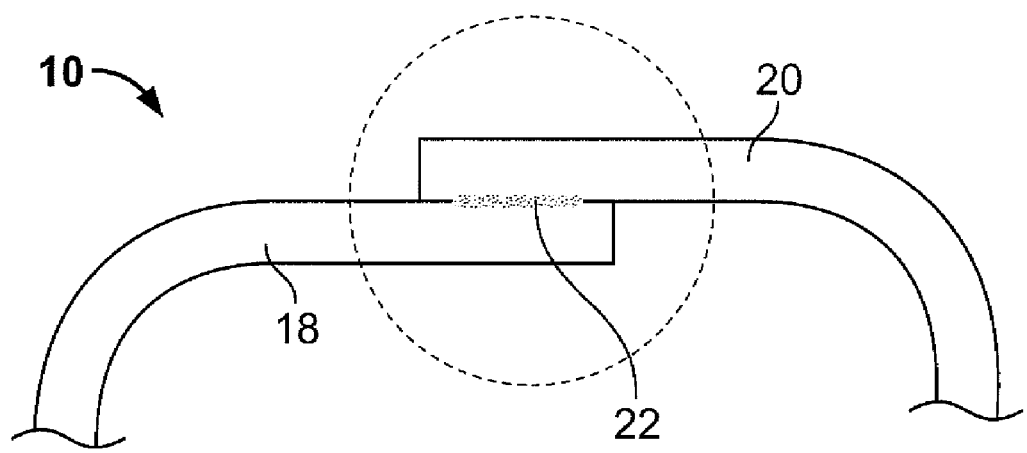
FIG. 1 is a side view of a lap seal package showing a heat seal between an inner and outer layer of the film at a reclosable lap seal area.

The reclosable lap seal for a package 10, as shown in FIG. 1, may comprise an inner lap seal segment or flap 18 and an outer lap seal segment or flap 20 that folds over the inner lap seal segment 18 to cover an opening in the package 10. The inner lap seal segment 18 and the outer lap seal segment 20 may both comprise at least three layers of film, such that there are at least three layers of film throughout the entire package 10. More than three layers may be possible, as long as a pressure sensitive adhesive layer is sandwiched between two layers, i.e., one layer on either side of the adhesive layer.

The film structure for the package 10 comprises at least a first 12 and a third 16 layer that are both polyolefin layers and a second layer 14 that is the pressure sensitive adhesive positioned between the first 12 and the third 16 layers. The layers are positioned such that the third layer 16 is closest to the interior of the package 10 and the first layer 12 is closest to the exterior of the package 10. The third layer 16 typically may contain barrier properties in the film, thus providing protective qualities for the food product contained inside.

The at least three layers are further positioned such that each layer has two sides, an inner and an outer side. The inner side of the third layer 16 is adjacent the interior of the package 10 and the outer side is adjacent the inner side of the second layer 14. Typically, as mentioned above, the third layer acts as a barrier layer. The outer side of the second layer 14 is adjacent the inner side of the first layer 12, and the outer side of the first layer 12 makes up the exterior of the package 10. The layers are positioned such that the inner side of each is directed towards the package 10 interior and the outer side of each is directed towards the package 10 exterior.

Figure 2:
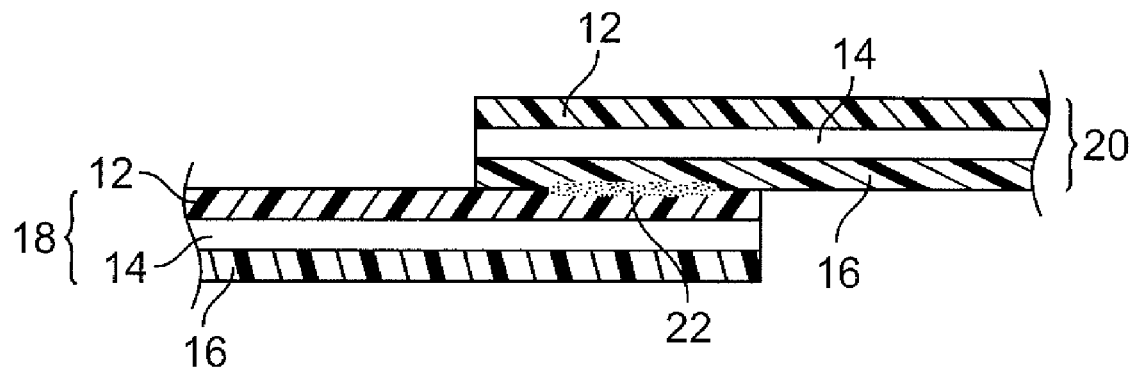
FIG. 2 is a detailed sectional view of the reclosable lap seal area of FIG. 1 in the closed position, detailing the laminate layers within the inner and outer layer of the film.

Once the multiple layer, i.e., at least three layer, film is formed, the package 10 may be assembled. After food product is inserted into the package 10, the opening of the package 10 is closed and sealed. The package 10 is closed by folding the outer lap seal segment 20 over the opening and onto the inner lap seal segment 18. A heat source is then applied to form a heat seal 22 in the area where the outer lap seal segment 20 overlaps with the inner lap seal segment 18, to form a closure seal. As the two segments are brought together in an overlapping configuration, the outer side of the first layer 12 on the inner lap seal segment 18 is in contact with the inner side of the third layer 16 of the outer lap seal segment 20, and when the heat seal 22 is formed the two layers form a comparatively inseparable bond, as shown in FIG. 2.

Once the heat seal 22 is formed there may be varying heat seal strengths formed between the film layers. For example, there may be a heat seal strength formed between the first 12 and third 16 layers that is greater than a heat seal strength formed between the second 14 and third 16 layers. Furthermore, there may be a heat seal strength between the second 14 and third 16 layers that is greater than the heat seal strength between the first 12 and second layers 14, such that when the lap seal segments 18 and 20 are separated at the heat seal 22, only the seal between the first 12 and second 14 layers separates on one of the lap seal segments 18 and 20 and the other seals remain intact. When the lap seal segments 18 and 20 are separated to initially open the package 10, the outer lap seal segment 20 is pulled away from the inner lap seal segment 18 delaminating at the areas with lesser heat seal strengths. The heat seal strengths are chosen such that the package 10 will easily delaminate between the first 12 and second 14 layers of one lap seal segment and remain bonded between the other layers. Similarly, the PSA is chosen to have adequate adhesion strength to facilitate closing of the package 10 by the consumer applying pressure in the closure area to reclose.

Figure 3:
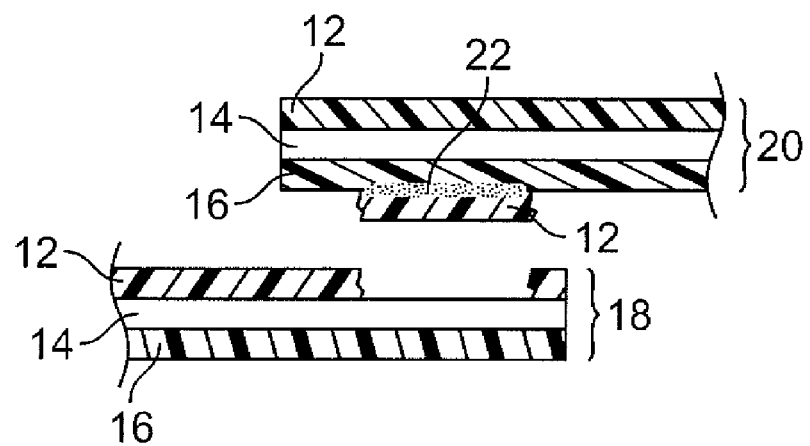
FIG. 3 is a detailed sectional view of the reclosable lap seal area of FIG. 1 after it has been opened, detailing the laminate layers within the inner and outer layer of the film.

For example, one possible orientation may be where the first layer 12 on the inner lap seal segment 18 separates from the second layer 14 on the inner lap seal segment 18, thus exposing the second layer 14 on the inner lap seal segment 18, as shown in FIG. 3. As the first layer 12 separates from the second layer 14 of the inner lap seal segment 18, they delaminate in the area of the heat seal 22, such that a portion of the first layer 12 remains attached to the outer lap seal segment 20 in the heat seal area 22, as in FIG. 3, and the remaining portion of the first layer 12, not in the heat seal area 22, remains attached to the inner lap seal segment 18. The outer lap seal segment 20 may contain substantially no exposed adhesive after the first layer 12 and the second layer 14 are separated, and the exposed adhesive layer on the second layer 14 of the inner lap seal segment 18 may be exposed along substantially the entire length of the lap seal area. To reclose the package 10, the outer lap seal segment 20 may be pressed against the exposed PSA of the second layer 14 on the inner lap seal segment 18.

Figure 4:
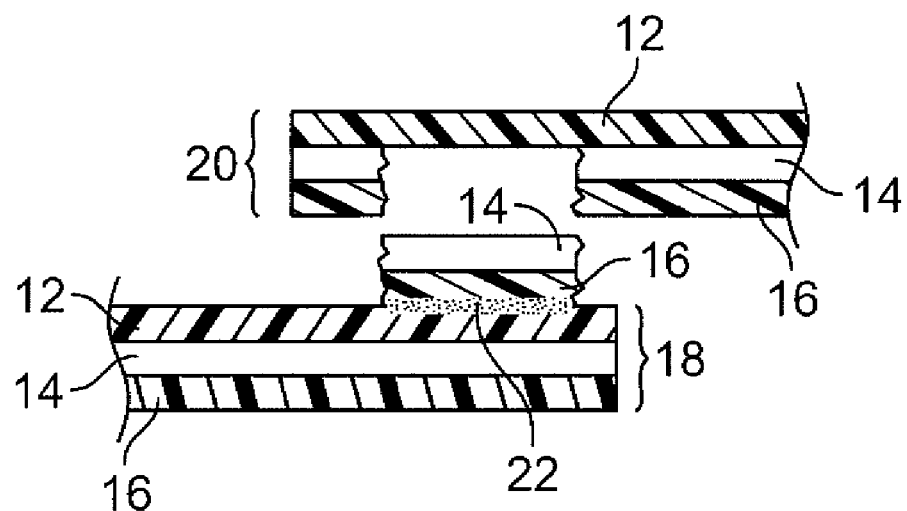
FIG. 4 is another detailed sectional view of the reclosable lap seal area of FIG. 1 after it has been opened, detailing the laminate layers within the inner and outer layer of the film.

Another possible orientation may be where the second layer 14 on the outer lap seal segment 20 separates from the first layer 12 on the outer lap seal segment 20, thus exposing the second layer 14 which remains attached to the inner lap seal segment 18, as shown in FIG. 4. The two layers are again delaminated in the area of the heat seal 22, such that in the heat seal area 22, the outer lap seal segment 20 now consists of primarily the first layer 12 and the inner lap seal segment 18 remains bonded to the third 16 and second 14 layers from the outer lap seal segment 20, in the area of the heat seal 22 as in FIG. 4. The outer lap seal segment 20 may contain substantially no exposed adhesive after the first layer 12 and the second layer 14 are separated, and the exposed adhesive layer on the second layer 14 of the inner lap seal segment 18 may be exposed along substantially the entire length of the lap seal area. To reclose the package 10, the outer lap seal segment 20 may be pressed against the remaining exposed PSA of the second layer 14, on the inner lap seal segment 18. Regardless of which delamination orientation results, the PSA layer is exposed on the inner lap seal segment 18 in the area of the heat seal 22, such that the PSA is positioned towards the exterior of the package 10 and away from the interior of the package 10. The PSA layer is positioned such that its exposed surface is directed away from the food removal path, thus facilitating avoidment of contamination and contact from food products and maintaining its adhesion strength longer than if it were directed towards the package 10 interior.

The at least three layer film may be made by coextrusion of the at least three layers or by colaminating with adhesive between layers, such as by coating and/or spraying the PSA layer onto either a first or third layer or both. The first layer 12 may have an inner side that is not heat-sealable, and therefore does not permanently seal to the second layer 14, and the first layer 12 may have an outer side that is heat-sealable. This provides for a heat seal of either lap or fin seal arrangements as both the exterior of the package 10 (i.e., the first layer 12) and the interior of the package 10 (i.e., the third layer 16) are heat-sealable, since fin seals may be necessary for the side seals. The first layer 12 is a polyolefin layer and typically may be a polypropylene film layer. The first layer 12 may be a coextruded polypropylene layer with at least a side that is heat-sealable and a side having a low surface energy by either a lack of corona treatment or by chemically treating the surface of the inner side, such that delamination from the second layer 14 may be facilitated. Alternatively, the inner side of the first layer 12 may have a metallized surface adjacent the outer side of the second layer 14. An example of an alternative first layer comprising a metallized BOPP film structure is available from Exxon Mobil Corporation, called 70 MET FILM, with a metal surface on the inner side.

The second layer 14 comprises the pressure sensitive adhesive (PSA) positioned between the first 12 and the third 16 layers. Examples of a PSA may be an extrudable styrene block copolymer, natural rubber (such as poly(cis-isoprene)), acrylates, silicones (such as polydimethylsiloxane), poly (iso-butylene), polyvinyl ethers, polybutadiene, and the like. The second layer may be either coextruded, coated or sprayed onto the third and/or first layer. An example of spray-on PSA is available from 3M Company, and is called Spra-Ment™ Craft and Display Adhesive.

The third layer 16 may comprise either a two-side heat-sealable film or a single-side heat sealable film. The third layer typically may be a polypropylene film layer, such as is available from Exxon Mobil Corporation, called BSR-1, and may further be selected to have barrier properties. Another example of the third layer 16 may be obtained from Exxon Mobil Corporation, called 90 LCX FILM, which works well with the 3M spray-on adhesive. The first 12 and third 16 layers can be any of a number of polyoelfins chosen to obtain the desired barrier performance and release (or no release as in the case of the third layer) from the second layer 14.

Figure 5:
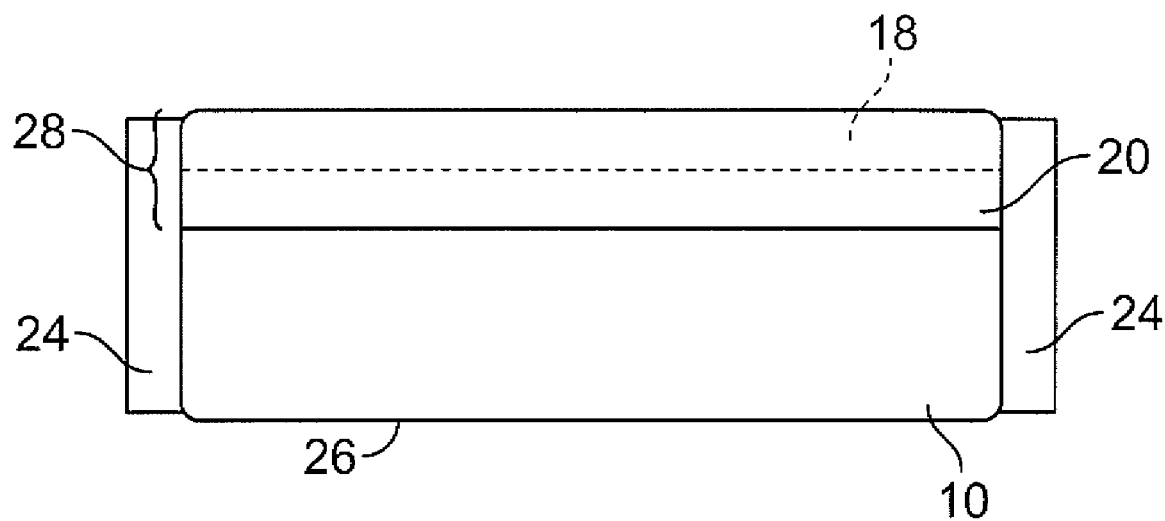
FIG. 5 is a front elevational view of a package with the reclosable lap seal of FIG. 1.

The lap seal 28 may be positioned at an upper edge of the package 10 that is opposite a fold seam 26, where a single web of film is used and folded over to create a package 10, as shown in FIG. 5. The package 10 may also have a second edge seal 24 and a third edge seal 24 that may be positioned at the side edges of the package and are transverse to the fold seam 26 and to the heat seal 22 of the lap seal, however any orientation of the seals is possible as long as the package 10 is opened at the end having the resealable lap seal. The second edge seal 24 and the third edge seal 24 may be either a lap seal or a fin seal. Either seal arrangement (i.e., lap or fin seal) is possible because either side of the package 10 is capable of heat-sealing to itself due to both the first layer 12 and the third layer 16 having heat seal properties. The package 10 may contain any type of food product such as cookies, crackers, cereal, and the like, and may further be disposed in an outer container, such as a box. The package 10 may be used by opening the lap seal while the package 10 is still in the outer container and dispensed from the outer container, or the package 10 may be fully removed from the outer container before use. If removed from the container before use, the package 10 may be opened and the food product can be consumed directly from the package 10 by using it as a serving dish by fully opening the lap seal and propping the package 10 open.

The method of manufacture may utilize Vertical Form Fill and Seal (VFFS) equipment used for conventional packages, where a difference from conventional use is that the web of film may now comprise at least three layers of film instead of a single layer. The at least three layer film, where a middle layer includes the PSA layer, is then fed into the VFFS machine and folded to make a package 10. The second edge seal 24 and third edge seals 24 are made, in either a fin seal or a lap seal arrangement, to form a pouch with three enclosed ends and one open end for filling. Food product can then be inserted into the package 10 through the open end, opposite the fold seam. Once filled, the open end is sealed to form a lap seal 28 and to close the package 10 by folding over an outer lap seal segment 20 over an inner lap seal segment 18 so they overlap and close the opening of the package 10.

A heat source is applied to the area of overlap of the outer lap seal segment 20 and inner lap seal segment 18 to form a heat seal. Preferably the lap seal 28 will be at an edge of the package 10 rather than along a centerline of the package, with the second edge seal 24 and third edge seal 24 forming opposite side seals, transverse to the lap seal. The package 10 may be modified so that the point of access is now at the side of the standard package, along what used to be a seal, typically a fin seal, along a centerline of the package. The new lap seal that is now rotated so it is along the edge rather than the centerline, may be the point of access for the product, as opposed to the standard top or bottom fin seal (i.e., which becomes the side seals 24). Manufacture of the reclosable lap seal package 10 is often easier than the manufacture of existing reclosable packages because the multiple layer film is used throughout the package rather than just at the ends, and therefore can be used with existing methods utilizing the VFFS machine, rather than having to add a manufacturing step to incorporate a multiple layer film in the area of the reclosable seal, or to add a step to separately incorporate the adhesive. Also, because the PSA on the second layer 14 is positioned between the first 12 and third 16 layers, it can be used with existing manufacturing machines because the PSA layer is not exposed and is prevented from sticking to the machines during manufacturing.

From the foregoing it will be appreciated that a resealable film structure for a package is provided that allows for the resealing of the package, comprising a multiple layer film, with an interior pressure sensitive adhesive layer, and the manufacture thereof. However, the disclosure is not limited to the aspects and embodiments described hereinabove, or to any particular embodiments. Various modifications to the resealable film structure can result in substantially the same features.

What is claimed is:

1. A method of forming a reclosable seal for a package, the method comprising:
   heat-sealing a first edge to form the reclosable seal by contacting a first seal segment to a second seal segment and sealing to each other such that a heat seal is formed in a region between a first layer of the first seal segment and a third layer of the second seal segment where the first seal segment is an inner lap seal segment and the second seal segment is an outer lap seal segment;
   wherein the package has a first layer, a second layer having a pressure sensitive adhesive, and a third layer throughout, where the heat seal strength between the first and third layers is greater than the heat seal strength between the second and third layers, and the heat seal strength between the second and third layers is greater than the heat seal strength between the first and second layers and is effective to permit the first layer to separate from the second layer of one of the first seal segment and the second seal segment upon opening, at the region of the heat seal to expose the pressure sensitive adhesive of the second layer and oriented away from a package interior.

2. The method of claim 1, wherein the first layer and the third layer are both polyolefin layers.

3. The method of claim 1, further comprising the step of folding a single layer of a three-ply laminate film into a package such that one edge is a fold seam and the other three edges are sealed together.

4. The method of claim 1, further comprising the step of heat-sealing the film at a second and a third edge positioned opposite from each other and transverse to the first edge to form a second and a third seal, respectively, and in either a fin or lap seal arrangement.

5. The method of claim 1, further comprising the step of filling the package with a food product prior to initial sealing of the reclosable seal at the first edge.

6. The method of claim 1, wherein the first layer has an inner side that is not heat-sealable and an outer side that is heat-sealable.

7. The method of claim 1, wherein the third layer is one of a two-side heat-sealable film and a single-side heat-sealable film, adjacent an inner side of the second layer.

8. The method of claim 1, further comprising coating the second layer onto one or both of the first and third layers.

9. The method of claim 1, wherein the second layer is selected from the group consisting of an extrudable styrene block copolymer, natural rubber, acrylates, silicones, poly (iso-butylene), polyvinyl ethers, and polybutadiene.

10. The method of claim 1, further comprising:
    feeding a web of film into a machine, the web of film comprising an at least three layer film comprising the second layer having the pressure sensitive adhesive, the first layer, and the third layer on either side of the second layer;
    folding the web of film to form a bottom edge of the package and to form a first seal segment and a second seal segment each comprised of the at least three layer film;
    heat-sealing opposing side edges to form opposing side edge seals transverse to the bottom edge; and
    filling the package having three enclosed ends and one open end with a food product prior to heat-sealing the first edge.

11. The method of claim 10, wherein opposing side edge seals can be either lap seal or fin seal arrangements.

12. The method of claim 10, further comprising coating the second layer onto one or both of the first and third layers.

13. The method of claim 10, wherein a heat seal is formed in a region between the first layer of the first seal segment and the third layer of the second seal segment to form a lap seal arrangement.

14. The method of claim 10, wherein the first layer and the third layer are both polyolefin layers.

15. The method of claim 10, wherein the second layer is selected from the group consisting of an extrudable styrene block copolymer, natural rubber, acrylates, silicones, poly (iso-butylene), polyvinyl ethers, and polybutadiene.

16. The method of claim 10, wherein the first layer has an inner side that is not heat-sealable and an outer side that is heat-sealable.

17. The method of claim 10, wherein the third layer is one of a two-side heat-sealable film and a single-side heat-sealable film, adjacent an inner side of the second layer.

* * * * *